(12) United States Patent
Moore

(10) Patent No.: US 6,796,113 B2
(45) Date of Patent: Sep. 28, 2004

(54) GUARD AND DOLLY FOR LINE TRIMMING APPARATUS

(76) Inventor: Mark R. Moore, 400 Bagdad Rd., Westlake, LA (US) 70669

( * ) Notice: Subject to any disclaimer, the term of this patent is extended or adjusted under 35 U.S.C. 154(b) by 0 days.

(21) Appl. No.: 10/068,051

(22) Filed: Feb. 5, 2002

(65) Prior Publication Data

US 2002/0184868 A1 Dec. 12, 2002

Related U.S. Application Data

(63) Continuation of application No. 09/347,476, filed on Jul. 2, 1999, now Pat. No. 6,370,854.
(60) Provisional application No. 60/091,807, filed on Jul. 6, 1998.

(51) Int. Cl.[7] .................. A01D 34/63; A01D 34/90
(52) U.S. Cl. ......................................... 56/12.7
(58) Field of Search ............................. 56/12.7, DIG. 9, 56/16.7, 16.9, 17.1, 17.2, 255, 256; 280/79.2, 33.798, 47.131, 47.16, 47.24, 47.34

(56) References Cited

U.S. PATENT DOCUMENTS

| | | | |
|---|---|---|---|
| 2,608,043 A | 8/1952 | Berdan ..................... 56/25.4 |
| 2,721,433 A | 10/1955 | Berdan ..................... 56/25.4 |
| 2,942,397 A | 6/1960 | Clark ....................... 56/25.4 |
| 3,587,749 A | 6/1971 | Sauer ........................ 172/15 |
| 4,125,339 A | * 11/1978 | Pittinger et al. ........... 403/348 |
| 4,182,100 A | 1/1980 | Letter ....................... 56/16.7 |
| 4,224,784 A | 9/1980 | Hansen et al. .............. 56/16.9 |
| 4,287,709 A | 9/1981 | Lowry et al. |
| 4,312,178 A | 1/1982 | Callahan .................... 56/256 |
| 4,341,060 A | 7/1982 | Lowry et al. |
| 4,343,139 A | 8/1982 | Lowry et al. |
| 4,389,836 A | 6/1983 | Lowry et al. |
| 4,411,126 A | 10/1983 | Lowry et al. |
| 4,428,183 A | 1/1984 | Lowry et al. |
| 4,442,659 A | 4/1984 | Enbusk ...................... 56/12.7 |
| 4,446,680 A | 5/1984 | D'Alessandro ............. 56/11.9 |
| 4,463,544 A | 8/1984 | Carsello .................... 56/17.1 |
| 4,587,800 A | 5/1986 | Jimenez ..................... 56/16.9 |
| 4,633,658 A | 1/1987 | Nogawa |
| 4,679,385 A | 7/1987 | Carmine |
| 4,712,363 A | * 12/1987 | Claborn ..................... 56/16.7 |
| 4,756,147 A | 7/1988 | Savell |
| 4,796,415 A | 1/1989 | Moore ....................... 56/16.9 |
| 4,823,542 A | 4/1989 | Klever et al. |
| 4,914,899 A | 4/1990 | Carmine |
| 4,922,694 A | 5/1990 | Emoto ....................... 56/16.7 |
| 5,309,701 A | 5/1994 | McGuerty ................... 56/16.9 |
| 5,839,262 A | * 11/1998 | Sorensen .................... 56/16.7 |
| 5,970,692 A | * 10/1999 | Foster ....................... 56/12.1 |
| 5,970,694 A | * 10/1999 | Knox, Jr. .................... 56/16.7 |

* cited by examiner

*Primary Examiner*—Thomas B. Will
*Assistant Examiner*—Nathan Mammen
(74) *Attorney, Agent, or Firm*—Schultz & Associates, P.C.

(57) ABSTRACT

A guard and dolly for mounting a line trimming apparatus and maintaining the rotating spool or cutting element of the line trimming apparatus in a selected orientation with respect to the ground, in order to cut grass at a selected height above the ground regardless of the contour of the terrain, trim the grass adjacent to a structure such as a fence and edge along fixed structures such as a driveway or sidewalk. In a first embodiment a guard is provided with a tab-and-slot opening for receiving and mounting a corresponding motor coupling flange attached to the line trimming apparatus motor or frame. In a second embodiment, a universal dolly is characterized by a frame provided with front, rear and side wheel receptacles for receiving two or three wheels at selected receptacle locations and supporting the dolly frame in rolling relationship in a horizontal plane on a lawn for operation of the line trimmer in mowing, trimming and edging configurations.

6 Claims, 5 Drawing Sheets

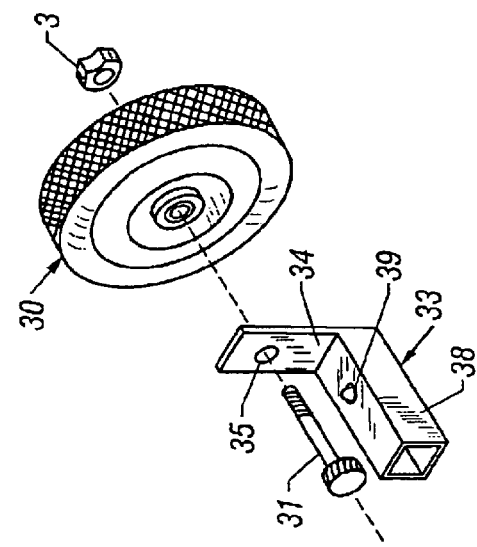
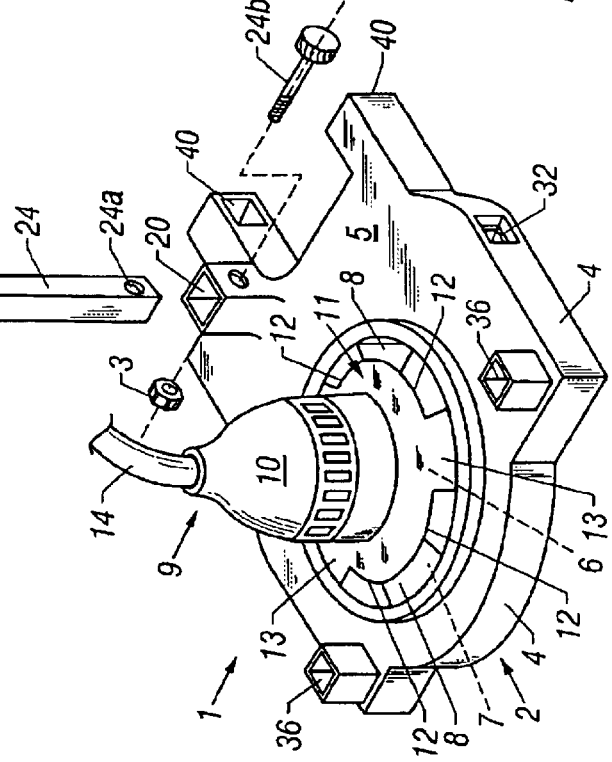

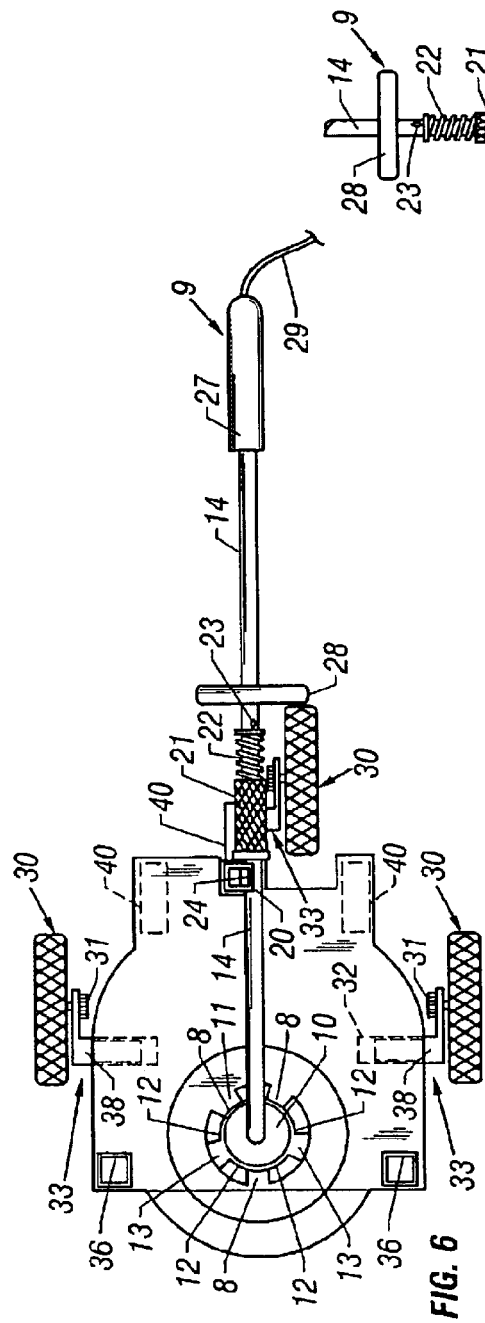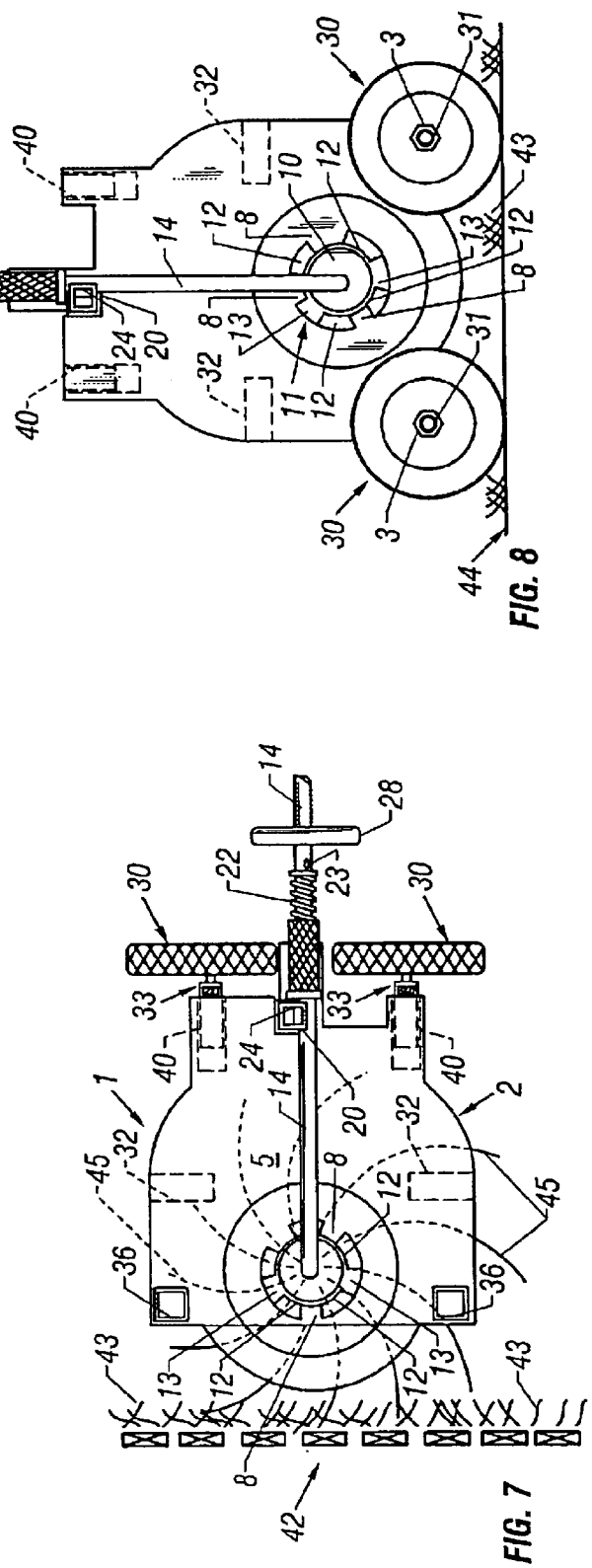

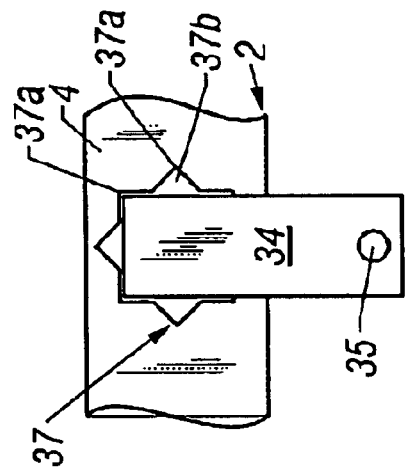
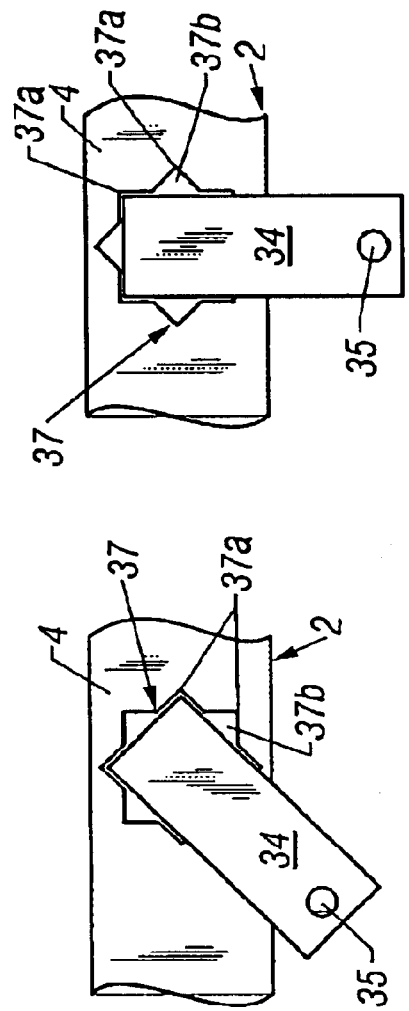
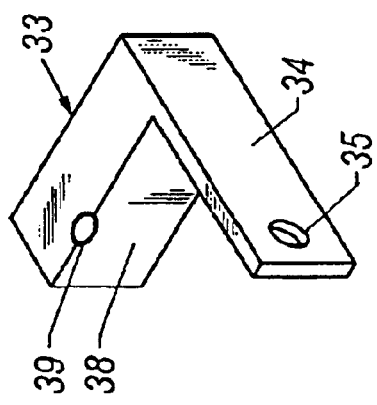
FIG. 11
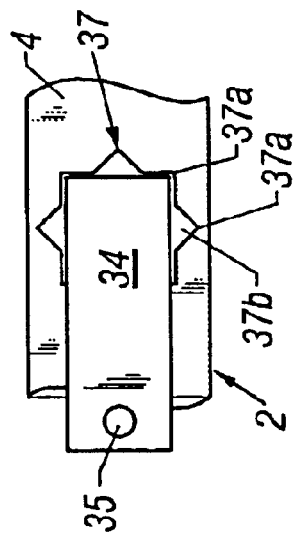

GUARD AND DOLLY FOR LINE TRIMMING APPARATUS

CROSS-REFERENCE TO RELATED APPLICATIONS

This application claims the benefit of U.S. Provisional Application Serial No. 60/091,807, filed Jul. 6, 1998 and is a continuation of U.S. patent application Ser. No. 09/347,476 filed Jul. 2, 1999 now U.S. Pat. No. 6,370,854.

FIELD OF THE INVENTION

This invention relates to line trimming devices and more particularly, to a guard and a dolly for receiving and mounting a line trimming device or apparatus and mowing, edging and trimming a lawn. The guard of this invention includes a shaped debris-deflection device having a tab-and-slot opening for receiving and mounting a corresponding coupling flange attached to the line trimming apparatus motor in a free-hand trimming configuration. In a second embodiment of the invention a universal dolly is broadly characterized by a dolly frame shaped and adapted for receiving a gasoline-powered or electric line trimmer for various lawn mowing, trimming and edging functions. The dolly is characterized by a frame base and plate having front, side and rear wheel receptacles for selectively receiving brackets which rotatably mount the wheels. In a first application of the dolly, three wheels are attached by means of the brackets to the side and the center rear wheel receptacle locations for supporting the dolly frame and line trimmer in rolling relationship in a horizontal plane for operation of the line trimmer in a mowing configuration. In a second application, the wheels in the side wheel receptacles are rearranged in the outside rear wheel receptacles to support the dolly frame and line trimmer in a horizontal plane for operation of the line trimmer in a trimming configuration. In yet another application of the dolly the wheels are attached to the front wheel receptacles only, to support the dolly frame and line trimmer in a vertical plane for operation of the line trimmer in an edging configuration. Accordingly, the line trimmer can be attached to a guard without wheels for use as a free-hand trimmer, as well as a universal dolly for disposition in mowing, trimming and edging configurations. In both of the embodiments, the line trimming apparatus is fitted with a motor coupling flange that engages a corresponding tab-and-slot opening in the guard and dolly frame, respectively, to removably mount the line trimming device on the free-hand trimmer and universal dolly, respectively.

One of the problems which exists in the use of conventional electric and gasoline-powered lawn mowers is that of cutting grass to a uniform height on lawns characterized by uneven terrain. Since the spacing between the front and rear wheels of a conventional lawn mower typically ranges from about 18 inches to about 30 inches, depending upon the lawn mower design, grass which is cut from the top of small hummocks and hills, as well as on other uneven terrain, is frequently shorter than that cut on level terrain or in small valleys, This problem is not alleviated by cutting the grass in a direction perpendicular to the normal direction of mower travel, since the span of the wheels ranges from about 18 inches to about 24 inches and this distance mandates cutting the grass either higher or shorter than desired, depending upon the nature of the terrain traversed by the mower.

Conventional line trimmers such as the line trimmer marketed under the well known "Weed Eater" trademark, are frequently used to trim grass in inaccessible areas where lawn mowers cannot be operated or in hilly or irregular areas where the terrain will not permit a lawn mower to cut the grass at a uniform height. However, since line trimmers are held by hand, cutting of the grass to a uniform height in such areas is extremely difficult and frequently results in "scalping" of the lawn or cutting and trimming the grass unevenly in these areas.

DESCRIPTION OF THE PRIOR ART

Line edgers and trimmers have long been known and used for trimming and edging lawns and other grassy and weed-infested areas. Typical of these devices are the devices disclosed in U.S. Pat. Nos. 4,047,299, and 3,859,776. Accessory devices are also used in connection with "edgers" and line trimmers and typical of these devices is the attachment described in U.S. Pat. No. 3,587,749, dated Jun. 28, 1971, to Gerald P. Sauer, entiled "A Lawn Edger Attachment For A Power Saw". In this patent the saw blade of an electric power saw is replaced with a two-side ground cutter blade and the power saw is attached to and carried by a wheeled carrier. A shoe on the power saw is attached to a base plate of the carrier and the shoe and cutter blade are adjustable relative to each other, in order to adjust the blade cutting height. A pivotally-mounted handle, by which the carrier may be pushed, carries a switch for stopping and starting the electric motor which drives the saw. The carrier base plate is supported on three wheels for ease of turning and maneuvering. An "Attachment For Line Trimmer" is disclosed in U.S. Pat. No. 4,224,784, dated Sep. 30, 1980, to Lee A. Hansen. This device is designed to convert a line trimmer to an edge trimmer and includes a collar with support legs attached thereto and wheels attached to the support legs. A U-shaped brace extends between the support legs, in order to hold the support legs at an angle with respect to each other. The collar is placed loosely around the handle of an existing line trimmer and the line trimmer is inverted, in order to present the spool thereof perpendicular to the ground. The legs are inserted into the collar and the collar is then secured to the handle, with the head of the line trimmer located between the ends of the U-shaped brace. U.S. Pat. No. 4,312,178, dated Jan. 26, 1982, to Allie Callaghan, details a "Lawn Edging Machine". The patent discloses a balanced, self-propelled and manually guided lawn edge in which an edging cutter blade is positioned near the inner side and rearwardly of the larger of two traction wheels of unequal diameter, mounted on a common drive axle. The smaller traction wheel can be axially adjusted relative to the larger wheel to regulate the angle of cut adjacent to a side wall or a curbing. A "Dolly For Lawn Trimmer and Combination Thereof" is disclosed in U.S. Pat. No. 4,442,659, dated Apr. 17, 1984, to H. J. Enbusk. The patent details a trimmer supported on a dolly, each of which trimmer and dolly is provided with a handle. The operator holds the dolly handle in one hand and the trimmer handle in the other hand and the trimmer is pivotally connected to the dolly, whereby movement of the handle of the trimmer relative to the dolly handle changes the approach angle of the trimmer relative to the movement of the dolly. The pivoted connection is positioned forward of the dolly wheels, whereby raising and lowering the dolly handle effects lowering and raising of the trimmer and the corresponding depth of cut. The pivoted connection includes adjustment means to adjust the positions of the trimmer relative to the dolly. U.S. Pat. No. 4,446,680, dated May 8, 1984, to Thomas C. D'Alessandro, details a "Battery Powered Lawn Edger". The device includes a frame supported on at least three wheels, which frame securely carries one or more rechargeable wet-cell batteries, as well as a pivotally-mounted sub-assembly having a heavy duty, series-wound drive motor, a rigid edger blade mounted on the drive motor output shaft and a blade guard. Re-charging may be accomplished by interconnection to a conventional automotive charging system, a battery charger or to a 115-volt power source. The blade is positioned to rotate in a plane generally perpendicular to the ground and a blade-positioning lever is pivotally attached to the main guide handle for vertical adjustment of the blade. A drive motor on-off switch attachable to the handle is also provided and a removable cover may be provided for protecting the battery energizers. One or more of the wheels may also include drive means for locomotion. U.S. Pat. No. 4,463,544, dated Aug. 7, 1984, to Anthony Carsello, et al, details an "Edger". The edger is provided with a rotatable cutting blade for trimming grass, weeds and the like. The cutting blade is driven by a motor mounted within a motor housing which is, in turn, supported for rotation about a longitudinal axis between a front wheel assembly and a rear wheel assembly. A locking mechanism is carried by the motor housing and is provided with a pair of spring-biased lugs normally received into locking recesses in the front and rear wheel assemblies to lock the motor housing into a selected rotational position and thereby lock the cutting blade at a selected angular orientation. My U.S. Pat. No. 4,796,415, dated Jan. 10, 1989, describes a "Dolly For Line Trimming Apparatus" characterized by a split frame provided with removable front and rear legs and removable side legs for selectively receiving wheels and supporting the dolly in rolling relationship on a lawn, driveway or sidewalk. The frame receives a line trimming apparatus and maintains the rotating spool of the apparatus in a selected orientation with respect to the ground, in order to cut the grass at a selected height above the ground regardless of the contour of the terrain, trim grass adjacent to a structure and edge along fixed structures. Other patents detailing various mowing and trimming configurations include U.S. Pat. No. 2,608,043, issued Aug. 26, 1952, to G. D. Berdan; U.S. Pat. No. 2,721,433, dated Oct. 25, 1955, also to Berdan; U.S. Pat. No. 2,942,397, dated Jun. 28, 1960, to Clark; U.S. Pat. No. 4,182,100, dated Jan. 8, 1980, to Letter; U.S. Pat. No. 4,587,800, dated May 13, 1986, to Jimenez; U.S. Pat. No. 4,922,694, dated May 8, 1990, to Emoto; and U.S. Pat. No. 5,309,701, dated May 10, 1994, to McGuerty.

An object of this invention is to provide a free-hand line trimming apparatus characterized by a guard having a tab-and-slot opening and a line trimming apparatus with a coupling flange provided thereon for engaging the tab-and-slot opening and coupling the apparatus to the guard.

Another object of this invention to provide a new and improved dolly for a line trimming apparatus, which dolly is characterized by a frame for removably receiving the motor, body or housing of a line trimmer and having square or star-shaped wheel-carrying front, rear and side receptacles for adapting the line trimmer to edge, trim and mow grass and cut weeds.

Yet another object of the invention is to provide a universal dolly for receiving and adapting a line trimming apparatus to edge, mow and trim grass and weeds, which universal dolly includes a typically metal or plastic dolly frame for removably receiving the frame, body or motor housing of a line trimming apparatus and wheel mount brackets fitted with wheels, selectively positioned on the dolly frame for converting the dolly into trimming, mowing and edging configurations, respectively.

Still another object of this invention is to provide a universal dolly for receiving and mounting a gasoline or an electric-powered line trimming apparatus, which dolly is characterized by removable wheels selectively arranged on the dolly by means of L-shaped wheel brackets, wherein the line trimming apparatus can be utilized to mow, edge or trim a lawn or yard by rearranging the wheel location and operation of the line trimming apparatus.

Yet another object of this invention is to provide a dolly for receiving and mounting an electrically-operated line trimmer by means of a tab-and-slot coupling mechanism and a sliding collar, which dolly includes removable front, side and rear wheels selectively arranged on the dolly to facilitate various configurations of the dolly and operation of the line trimmer and the dolly to mow, trim and edge a lawn.

Another object of this invention is to provide a dolly which is characterized by a shaped, typically metal or plastic frame, having frame receptacles and at least two wheels rotatably mounted on the frame receptacles at selected locations, which frame is further provided with a tab-and-slot or bayonet-type opening adapted to receive and mount a line trimmer having a correspondingly-shaped coupling flange, for mowing, trimming and edging a lawn or yard by rotation of the wheels and operation of the selectively-configured dolly and line trimmer.

Yet another object of this invention is to provide a universal dolly which is characterized by a typically fiberglass, plastic or metal frame and either three wheels or a pair of wheels positioned at selected receptacle locations on the frame, which frame is also fitted with a slotted opening adapted to receive a tabbed motor coupling flange on a line trimmer, such that the line trimmer and dolly cooperate to facilitate edging, mowing and trimming a lawn or yard.

A still further object of this invention is to provide a new and improved universal dolly having a dolly frame with a bayonet or tab-and-slot opening for removably receiving the coupling flange of a gasoline powered or electric line trimmer, along with a spring-loaded collar for engaging the line trimmer handle and facilitating arrangement of two or three wheels on the dolly frame, such that the line trimmer can be oriented into various configurations for mowing, edging and trimming a lawn or yard by changing the wheel configurations.

SUMMARY OF THE INVENTION

These and other objects of the invention are provided in a free-hand line trimming apparatus having a tab and slot locking flange for engaging a correspondingly-shaped tab and slot opening in a guard and removably locking the guard on the line trimming apparatus. In a second embodiment, a wheeled dolly having a shaped frame provided with front, side and rear wheel receptacles and a lock-and-tab type opening, which opening is adapted to receive the like-shaped coupling flange of an electric or gasoline-powered line trimmer and two or three wheels are selectively oriented to mow, edge or trim a lawn by arranging the positions of the wheels on brackets fitted in the frame wheel receptacles. The dolly frame mounts two wheels in first and second configurations and three wheels in a third configuration, for receiving the line trimmer and orienting the line trimmer in functional position to edge, trim and mow a lawn, respectively.

BRIEF DESCRIPTION OF THE DRAWINGS

The invention will be better understood by reference to the accompanying drawings, wherein:

FIG. 4 is a perspective, exploded view of a preferred universal dolly for receiving and mounting a conventional gasoline-powered or electric line trimmer according to this invention;

FIG. 5 is a side view, partially in section, of a typical bracket flange for mounting wheels, on the dolly illustrated in FIG. 4;

FIG. 6 is a top elevation of the universal dolly illustrated in FIG. 4, assembled with left, right and rear wheels and a guard added to the horizontally-oriented dolly frame and an electric line trimmer mounted on the frame in mowing configuration;

FIG. 7 is a top elevation of the universal dolly illustrated in FIG. 1, with an electric line trimmer mounted on the dolly and the wheels oriented in outside rear wheel receptacles in trimming configuration;

FIG. 8 is a side elevation of the universal dolly with the wheels mounted on the front wheel receptacles of the vertically-oriented dolly frame, to facilitate an edging function of the electric line trimmer along a sidewalk;

FIG. 11 is an isometric view of a wheel mount bracket; and

FIGS. 11a–11c show a wheel mount bracket inserted in a star-shaped receptacle at various positions to adjust wheel height.

DESCRIPTION OF THE PREFERRED EMBODIMENTS

Figure 1:
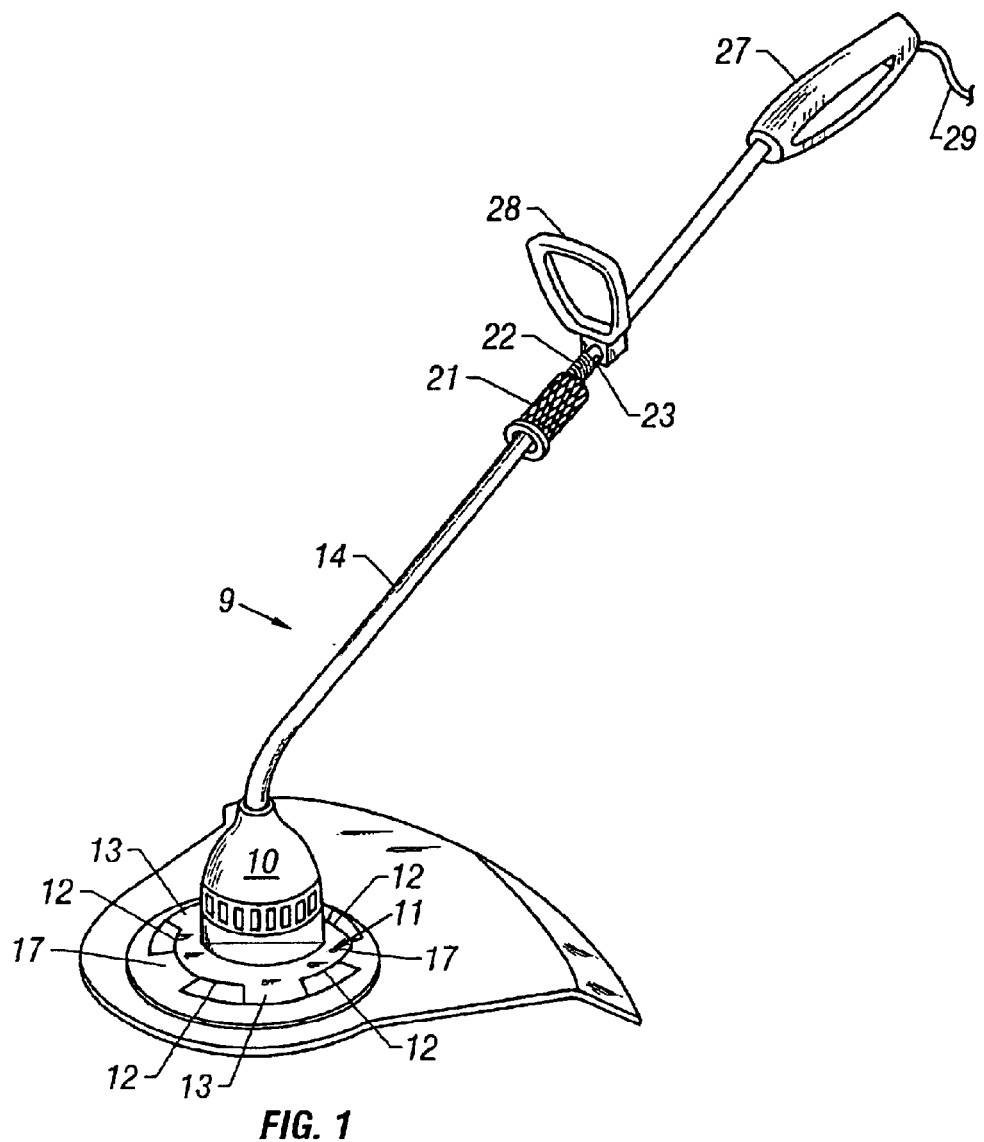
FIG. 1 is a perspective view of a typical line trimmer and guard embodiment of this invention.
Figure 2:
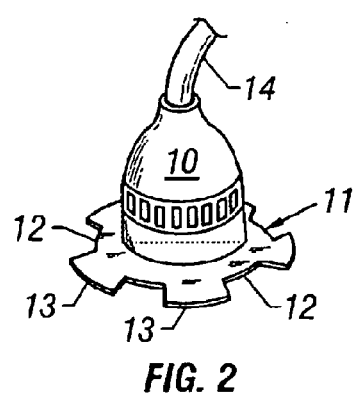
FIG. 2 is a perspective view of a typical line trimmer motor and shaft, fitted with a coupling flange for mounting the guard illustrated in FIG. 1.
Figure 3:
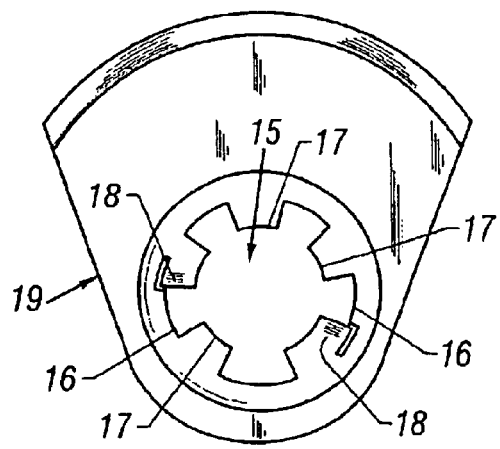
FIG. 3 is a top view of the guard illustrated in FIG. 1.
Figure 10:
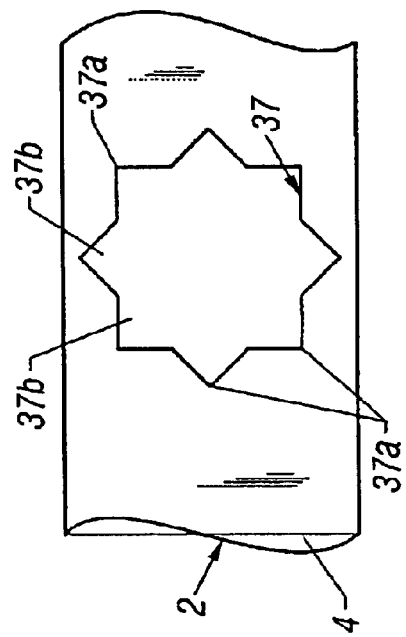
FIG. 10 is an alternative star-shaped wheel receptacle design for removably securing the wheels to the universal dolly.

Referring now to FIGS. 1–3 of the drawings, a typical line trimming apparatus which can be utilized in both embodiments of this invention is generally illustrated by reference numeral 9. The line trimming apparatus 9 is characterized by a motor 10, to which is connected a cutting element, spool or attachment 45a (illustrated in FIG. 9) in conventional fashion. A motor coupling flange 11 is typically attached to the motor 10 and the motor coupling flange 11 is characterized by alternating flange slots 12, which define flange tabs 13. An apparatus shaft or handle 14 typically extends from the top of the motor 10 and is fitted with a shaft collar 21, a top grip 27 and a middle grip 28. A trigger switch (not illustrated) is typically provided in the top grip 27 in conventional fashion for selectively energizing the motor 10. An electric power cord 29 extends from the top grip 27 for connecting an extension cord (not illustrated) of suitable size and design for supplying power to the motor 10.

As illustrated in FIG. 3, the guard 19 includes a guard motor coupling opening 15 which is configured with alternating guard coupling slots 16, that define guard coupling tabs 17, with a lock tab 18 shaped in two of the guard coupling tabs 17. This design facilitates mounting the motor coupling flange 11 and the attached motor 10 to the guard 19 by inserting the respective flange tabs 13 of the motor coupling flange 11 into the corresponding guard coupling slots 16 of the guard motor coupling opening 15 and twisting the motor 10 and the motor coupling flange 11, typically in the counterclockwise direction as the line trimming apparatus 9 and the guard 19 are viewed in FIGS. 1 and 3, to seat two of the flange tabs 13 on top of the downwardly-extending lock tabs 18 and the remaining flange tabs 13 under the remaining three guard coupling tabs 17, and secure the motor coupling flange 11 in the guard motor coupling opening 15. Release of the motor coupling flange 11 from the guard motor coupling opening 15 is effected by exerting downward and clockwise pressure on the apparatus handle 14 to facilitate sliding two of the flange tabs 13 off the slot tabs 18 and the remaining three flange tabs 13 from beneath the corresponding three guard coupling tabs 17, and further twisting the motor coupling flange 11 and the motor 10 in the clockwise direction to again align the respective flange tabs 13 and corresponding guard coupling slots 16.

In the second embodiment of this invention the line trimming apparatus 9 is designed to mount on a universal dolly, generally illustrated by reference numeral 1 in FIG. 4 of the drawing. The universal dolly 1 is characterized by a shaped dolly frame 2, having a frame base 4 and a flat frame plate 5, provided with a dolly motor coupling opening 6. The dolly motor coupling opening 6 is preferably a tab-and-slot or bayonet-type opening having the same design and configuration as the guard motor coupling opening 15 illustrated in FIG. 1, and is fitted with dolly coupling slots 7, defined by dolly coupling tabs 8, as illustrated in FIG. 4. The dolly frame 2 is designed to receive a line trimming apparatus 9 having a motor 10, such as the line trimming apparatus 9 illustrated in FIG. 1, which may have either a gasoline motor or an electric motor, as illustrated. The motor 10 is fitted with a motor coupling flange 11, as in the case of the line trimming apparatus 9 illustrated in FIG. 1. As heretofore described with respect to FIG. 2, the motor coupling flange 11 has flange slots 12, defined by flange tabs 13 that are designed to match and fit the dolly motor coupling opening 6, such that the respective flange tabs 13 of the motor coupling flange 11 initially register with corresponding dolly coupling slots 7 bordering the dolly motor coupling opening 6 and facilitate twisting of the motor 10 and the motor coupling flange 11 to engage the flange tabs 13 with the two lock tabs 18 and three of the dolly coupling tabs 8, respectively, as heretofore described with respect to FIGS. 1–3. When this maneuver is accomplished, the universal dolly 1 is configured as illustrated in FIG. 4, with the apparatus handle 14 extending from fixed attachment to the motor 10 and lying adjacent to a concave surface 26 of a brace bracket 25, welded or otherwise provided on one end of a shaft brace 24. The opposite end of the shaft brace 24 is fitted in a brace receptacle 20, molded in or provided on the rear of the dolly frame 2 and is secured by a brace mount bolt 24b, extending through a registering brace receptacle opening 20a and a brace opening 24a, as illustrated in FIG. 4. A shaft collar 21 is slidably disposed on the motor shaft 14 against a shaft collar spring 22 seated on a spring pin 23, extending through the apparatus handle 14, as illustrated in FIG. 4. Accordingly, it will be appreciated from a consideration of FIG. 4 that the apparatus handle 14 can be removably secured to the brace bracket 25 of the shaft brace 24 when seated in the concave surface 26 of the shaft brace 24, as the shaft collar 21 is retracted against the shaft collar spring 22. When the shaft collar 21 is released and seated by the shaft collar spring 22 on the brace bracket 25, the motor coupling flange 11 is prevented from vibrating or otherwise loosening in the dolly motor coupling opening 6, to maintain the line trimming apparatus 9 securely on the dolly frame 2 of the universal dolly 1.

As further illustrated in FIGS. 4–6 of the drawings, three wheels 30 are mounted on corresponding wheel mount brackets 33. Each wheel mount bracket 33 has a bracket flange 34 fitted with a flange opening 35, for receiving a wheel bolt 31 and a nut 3, and securing each of the respective wheels 30 to a corresponding wheel mount bracket 33. The wheel mount brackets 33 are generally shaped in an "L" configuration, wherein a stub axle 38 extends from the bracket flange 34 and may be inserted in the respective front wheel receptacles 36, side wheel receptacles 32 and rear wheel receptacles 40, provided in the frame base 4 of the dolly frame 2 as further illustrated in FIG. 4. In a first preferred embodiment of the invention the stub axles 38 of the respective wheel mount brackets 33 are inserted in square front wheel receptacles 36, side wheel receptacles 32 and rear wheel receptacles 40 and may be provided with a conventional spring-loaded axle lock ball 39, which fits in a corresponding ball groove or recess 39a, located in the frame base 4 of the dolly frame 2. Alternatively, the opening in the frame base 4 of the dolly frame 2 which receives the stub axle 38 may be a star receptacle 37, having star points 37a defined by star slots 37b, for receiving the square stub axle 38, as illustrated in FIGS. 10 and 11A–11C. In this manner, the stub axle 38 can be fitted into the respective star slots 37b of the star receptacle 37 to position the corresponding wheel mount brackets 33 and wheels 30 in any desired height on the dolly frame 2, as further illustrated in FIGS. 11A–11C. In this embodiment of the invention the axle lock ball 39 may be provided at one corner of the stub axle 38 as illustrated in FIG. 11, to facilitate engaging a corresponding ball groove 39a provided in the frame base 4, as illustrated in FIGS. 11A–11C.

Referring again to FIGS. 4–6 of the drawings, under circumstances where the universal dolly 1 is configured in mowing configuration, the wheels 30 are arranged on the dolly frame 2 with two of the wheels 30 disposed in opposite side wheel receptacles 32 by operation of the stub axle 38 in the wheel mount brackets 33, while a third wheel 30 is similarly attached to the middle one of the rear wheel receptacles 40, as indicated in the FIG. 6. The line trimming apparatus 9 is then attached to the dolly frame 2 by inserting the motor coupling flange 11 in the dolly motor coupling opening 6, such that the apparatus handle 14 is spaced from the brace bracket 25, opposite the concave surface 26, and the flange tabs 13 initially register with the corresponding dolly coupling slots 7 and a twisting or turning of the motor 10 in the counterclockwise direction then engages the flange tabs 13 with the lock tabs 18 (FIG. 3) and the dolly coupling tabs 8 of the dolly motor coupling opening 6, with the apparatus handle 14 adjacent the brace bracket 25. Accordingly, this maneuver causes the apparatus handle 14 to align with and engage the concave surface 26 of the brace bracket 25, as the shaft collar 21, slidably mounted on the apparatus handle 14, is depressed against the bias of the shaft collar spring 22, seated on the spring pin 23. The shaft collar 21 is then released to slide over the brace bracket 25, thus securing the line trimming apparatus 9 in the dolly frame 2 of the universal dolly 1 and facilitating use of the universal dolly 1 in mowing configuration.

Under circumstances where the universal dolly 1 is oriented in the side trimmer configuration for trimming along a fence 42, for example, the wheels 30 are arranged as illustrated in FIG. 7. Accordingly, a pair of wheels 30 are mounted in the two outer rear wheel receptacles 40 using the stub axles 38 of the wheel mount brackets 33, such that the two wheels 30 are aligned with each other, and the line trimming apparatus 9 is secured in position on the dolly frame 2 as described above with respect to FIG. 6 in mowing configuration. The trimming orientation of the universal dolly 1 facilitates traversal of the universal dolly 1 along the fence 42 and allows close cropping or trimming of the grass 43 along and beneath the fence 42, using a suitable cutting element 45, attached to the shaft (not illustrated) of the motor 10.

Figure 9:
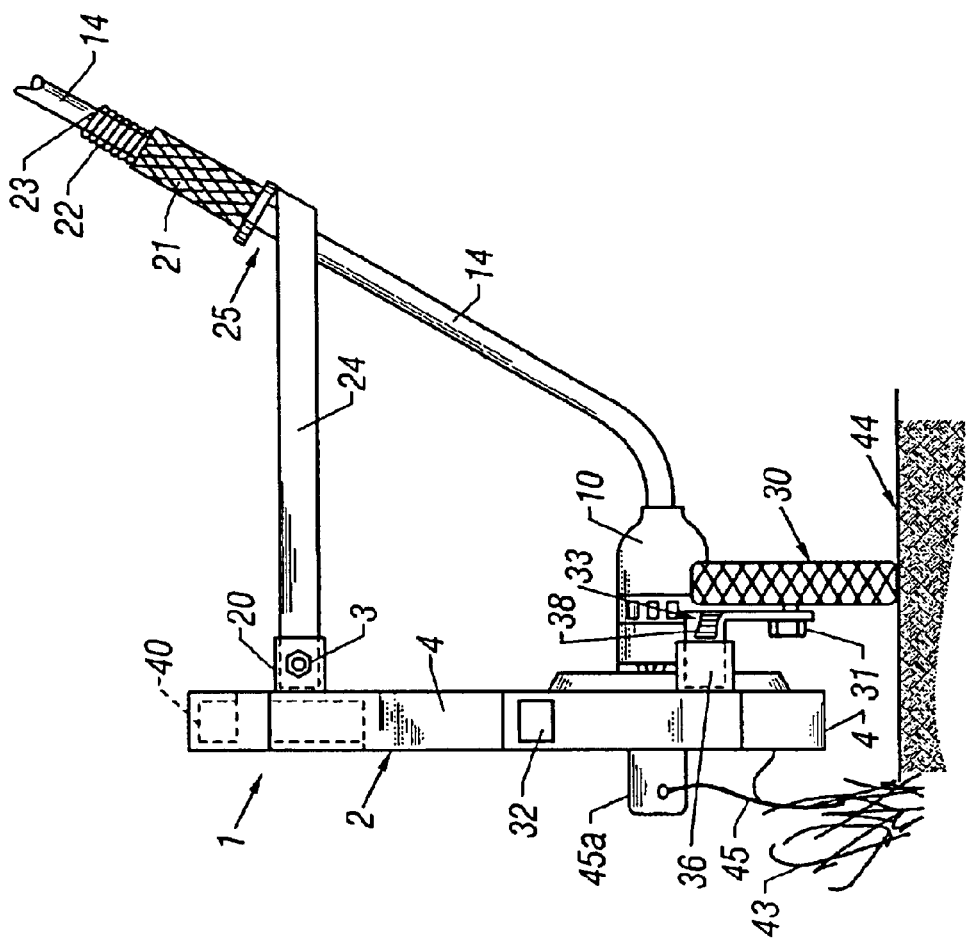
FIG. 9 is a front elevation of the universal dolly illustrated in FIG. 8, in the edging configuration.

Under circumstances where the universal dolly 1 is to be positioned in the edging configuration, for example along the edge of a sidewalk 44 as illustrated in FIGS. 8 and 9, a pair of the wheels 30 are mounted on the upward standing, spaced-apart pair of front wheel receptacles 36, using the stub axles 38 of the wheel mount brackets 33, as indicated above. Furthermore, the line trimming apparatus 9 is mounted on the dolly frame 2 as indicated with respect to the side trimmer and mowing configurations described above, such that the dolly frame 2 can be positioned in the upright, vertical configuration illustrated in FIGS. 8 and 9 and moved along the sidewalk 43 to trim the grass 43 at the edge of the sidewalk 43 as indicated.

It will be appreciated by those skilled in the art that substantially any type of line or alternative cutting element connecting, coupling or storing mechanism such as the spool 45a, can be used in the line trimming apparatus 9 and attached to the revolving portion or shaft (not illustrated) of the motor 10 to facilitate cutting grass using the universal dolly 1 or the line trimming apparatus 9 with the guard 19. Accordingly, the shaft of the motor 10 may be provided with an adaptor or adaptors or a spool of suitable design for receiving cutting string or line, or slots may be provided in the adaptor for fitting various cutting implements or elements, including plastic cutting elements or the like, according to the knowledge of those skilled in the art. Furthermore, the motor 10 may be energized by a battery, as well as a fixed power source and many different types of line trimmers can be used in place of the line trimming apparatus 9, regardless of design.

While the preferred embodiments of the invention have been described above, it will be recognized and understood that various modifications may be made therein and the appended chains are intended to cover all such modifications which may fall within the spirit and scope of the invention.

Having described my invention with the particularity set forth above, what is claimed is:

1. A dolly system for a line trimming apparatus comprising a dolly frame adapted to support a line trimming apparatus thereon, said dolly frame including a coupling portion for connecting said dolly system to said line trimming apparatus, first and second opposed wheel receptacles for receiving wheel mounting brackets for first and second opposed support wheels, a third wheel receptacle for receiving a wheel mounting bracket for a third support wheel for supporting said line trimming apparatus in one of a mower and trimmer configuration, and fourth and fifth wheel receptacles for receiving wheel mounting brackets for respective support wheels for supporting said line trimming apparatus in an edger configuration wherein said coupling portion includes an opening in said dolly frame including a plurality of circumferentially spaced tabs cooperating with corresponding tabs on said line trimming apparatus for receiving said line trimming apparatus in a twist and lock coupling between said line trimming apparatus and said dolly;

at least one of said tabs on said dolly comprises a resiliently deflectable lock tab for forcibly engaging a cooperating tab on said line trimming apparatus to releasably lock said line trimming apparatus to said dolly; and said system includes a generally planar guard member including an opening formed therein and lock tabs formed thereon for releasable engagement with corresponding tabs on said line trimming apparatus to be used when the line trimming apparatus is not in one of the mower, trimmer and edger configuration.

2. In combination, a line trimming apparatus having a rotatable cutting element and a coupling flange including a plurality of circumferentially spaced alternating slots and tabs formed thereon, a dolly for supporting said line trimming apparatus for operation as at least one of a mower, edger and trimmer, said dolly including a coupling opening comprising a plurality of circumferentially spaced tabs cooperable with corresponding tabs on said coupling flange and for receiving said line trimming apparatus in a twist and lock coupling between said line trimming apparatus and said dolly and a generally planar guard member including an opening formed therein and characterized by tabs for releasable engagement with corresponding tabs on said coupling flange whereby said line trimming apparatus may be used as a hand carried trimming apparatus with said guard attached thereto and said guard may be disconnected from said coupling flange so that said line trimming apparatus may be connected to said dolly for use as one of said mower, edger and trimmer.

3. The combination set forth in claim 2 wherein:

said dolly includes a frame including first and second opposed wheel connectors thereon for receiving wheel mounting brackets for first and second opposed support wheels, and a third wheel connector for a wheel mounting bracket for a third support wheel for supporting said line trimming apparatus in a mower configuration.

4. The combination set forth in claim 3 including:

fourth and fifth wheel connectors for wheel mounting brackets for respective support wheels for supporting said line trimming apparatus in an edger configuration.

5. A dolly for a line trimming apparatus comprising a dolly frame adapted to support a line trimming apparatus thereon, said dolly frame including a coupling portion for connecting said dolly to said line trimming apparatus, first and second opposed wheel receptacles for receiving wheel mounting brackets for first and second opposed support wheels, a third wheel receptacle for receiving a wheel mounting bracket for a third support wheel for supporting said line trimming apparatus in a configuration alternatively selected from the ground consisting of a mower configuration and a trimmer configuration, and fourth and fifth wheel receptacles for receiving wheel mounting brackets for respective support wheels for supporting said line trimming apparatus in an edger configuration and, wherein the first and second opposed wheel receptacles and third, fourth and fifth wheel receptacles are each star-shaped wheel receptacles and wherein the wheel mounting brackets are rectangular and adapted to fit within first and second opposed wheel receptacles and third, fourth and fifth wheel receptacles to adjust the height of the dolly.

6. A dolly for a line trimming apparatus comprising a dolly frame adapted to support a line trimming apparatus thereon, said dolly frame including a coupling portion for connecting said dolly to said line trimming apparatus, first and second opposed wheel receptacles for receiving wheel mounting brackets for first and second opposed support wheels, a third wheel receptacle for receiving a wheel mounting bracket for a third support wheel for supporting said line trimming apparatus in a configuration alternatively selected from the group consisting of a mower configuration and a trimmer configuration, and fourth and fifth wheel receptacles for receiving wheel mounting brackets for respective support wheels for supporting said line trimming apparatus in an edger configuration and, wherein the wheel mounting brackets are rectangular and adapted to fit within first and second opposed wheel receptacles and third, fourth and fifth wheel receptacles to adjust the height of the dolly and, wherein the dolly may be adjusted to at least three different heights by rotating the wheel mounting brackets in the first and second opposed wheel receptacles and the third, fourth and fifth wheel receptacles, wherein the first and second opposed wheel receptacles and the third, fourth, and fifth wheel receptacles are each star-shaped wheel receptacles.

* * * * *